United States Patent [19]

Tsuda

[11] Patent Number: 5,662,760
[45] Date of Patent: Sep. 2, 1997

[54] METHOD OF MANUFACTURING LAMINATED VENEER LUMBER AND DECORATIVE LAMINATED SHEET UTILIZING THE SAME

[76] Inventor: Sotaro Tsuda, 4-13, Nekogahora-dori, Chikusa-ku, Nagoya, Aichi-ken, Japan

[21] Appl. No.: 466,044

[22] Filed: Jun. 6, 1995

Related U.S. Application Data

[63] Continuation-in-part of Ser. No. 149,985, Nov. 10, 1993, abandoned.

[30] Foreign Application Priority Data

Nov. 11, 1991 [JP] Japan ................. 3-322491

[51] Int. Cl.⁶ .................. B32B 31/20; B32B 31/12; B27D 1/00; B27D 3/00
[52] U.S. Cl. .................. 156/264; 156/255; 156/258; 156/263; 156/266; 156/288; 156/304.5; 156/311; 34/66; 34/419; 144/364; 100/38
[58] Field of Search .................. 156/255, 258, 156/263, 264, 266, 267, 269, 304.5, 311, 583.1, 583.5, 288; 34/66, 107, 419, 611; 100/38, 92, 93 R, 93 P; 144/364, 380

[56] References Cited

U.S. PATENT DOCUMENTS

| | | |
|---|---|---|
| 1,694,489 | 12/1928 | Rubinstein ................. 34/66 |
| 3,287,195 | 11/1966 | Piazze . |
| 3,562,045 | 2/1971 | Hasegawa . |
| 3,713,944 | 1/1973 | Dennis et al. . |
| 3,896,559 | 7/1975 | Martin . |
| 3,970,497 | 7/1976 | Glover et al. . |
| 3,990,142 | 11/1976 | Weglin . |
| 4,003,163 | 1/1977 | Schmidt . |
| 4,061,169 | 12/1977 | Hasegawa . |
| 4,188,730 | 2/1980 | Allen et al. . |
| 4,193,830 | 3/1980 | Milne . |
| 4,320,572 | 3/1982 | Brower et al. . |
| 4,473,099 | 9/1984 | Koike et al. . |
| 4,494,588 | 1/1985 | Berry et al. . |
| 4,565,597 | 1/1986 | Schülte . |
| 4,608,106 | 8/1986 | Lahtinen ................. 156/258 X |
| 4,791,970 | 12/1988 | Walser et al. . |
| 4,793,393 | 12/1988 | Pelz . |
| 4,805,287 | 2/1989 | Perini et al. . |
| 4,841,907 | 6/1989 | Otsuka . |
| 4,930,556 | 6/1990 | Prihoda . |
| 4,931,113 | 6/1990 | Feichtmeir et al. . |
| 5,002,106 | 3/1991 | Binder ................. 144/364 |
| 5,199,186 | 4/1993 | Rice et al. . |

FOREIGN PATENT DOCUMENTS

| | | |
|---|---|---|
| 55-26961 | 7/1980 | Japan . |
| 62-16803 | 4/1987 | Japan . |
| 63-7122 | 2/1988 | Japan . |
| 1-4881 | 1/1989 | Japan . |
| 1-37243 | 8/1989 | Japan . |

OTHER PUBLICATIONS

Andrew D. Wood & Thomas G. Linn, "Plywoods: Their Development, Manufacture and Application," 1950, pp. 43–50, 58–65.

E. Vernell Knight & Memrad Wulpi, "Veneers and Plywood," 1927, pp. 207–212.

*Primary Examiner*—Melvin Mayes
*Attorney, Agent, or Firm*—Lowe, Price, LeBlanc & Becker

[57] ABSTRACT

The present invention provides a method of manufacturing high quality laminated veneer lumber from pre-flattened wood veneer, for such uses as in architecture and furniture, and a method of mass production thereof using veneer which is flattened in advance. A sheet of veneer is first obtained by cutting a log with a rotary lathe or the like, and flattening and cutting the veneer into a predetermined length. Sheets of veneer thus obtained are cut on both edges in the grain direction to form symmetrically diagonal end faces, and are bonded with one another at these end faces with their grain directions aligned to form an elongated sheet of veneer. The resultant elongated sheet veneer is cut into a predetermined length to form laminated veneer material having seams. Plural sheets thus formed laminated veneer material are laminated and bonded with their grain directions aligned to form laminated veneer core. The laminated veneer core is either directly used as a laminated veneer lumber, or is covered with another sheet of seamless veneer on an outer surface.

16 Claims, 7 Drawing Sheets

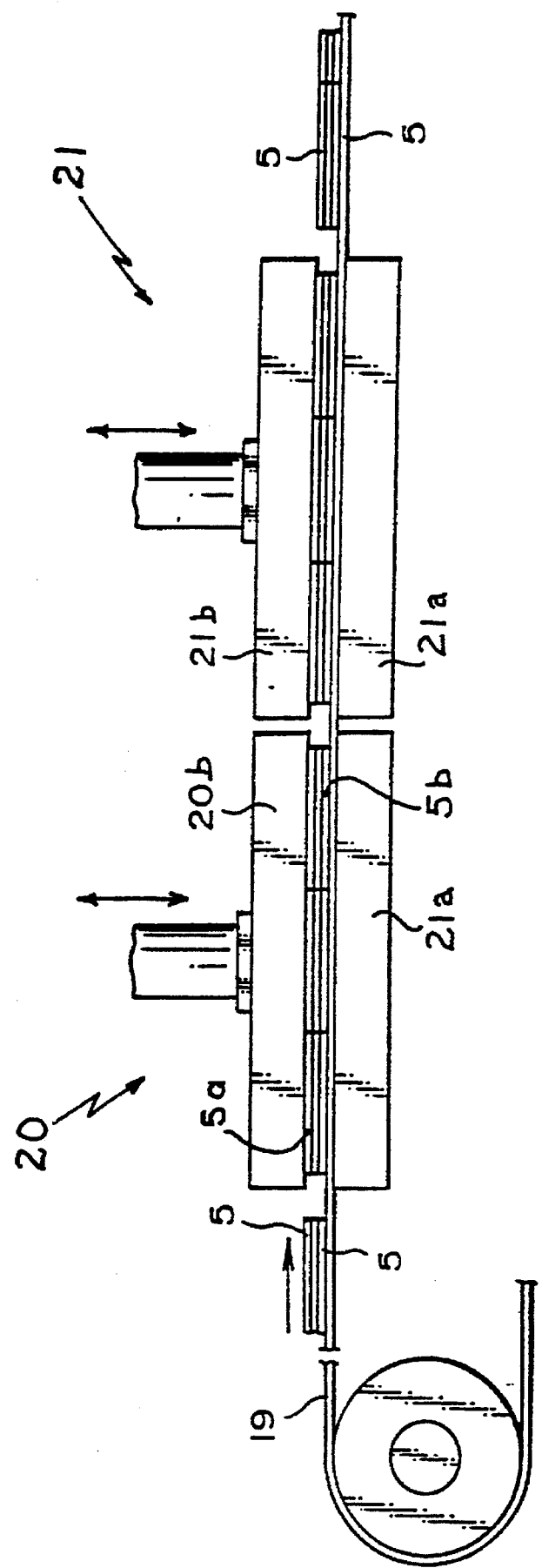

METHOD OF MANUFACTURING LAMINATED VENEER LUMBER AND DECORATIVE LAMINATED SHEET UTILIZING THE SAME

This is a continuation-in-part of U.S. application Ser. No. 08/149,895, filed on Nov. 10, 1993, now abandoned.

FIELD OF THE INVENTION

The present invention relates to a method of manufacturing a laminated veneer lumber which is widely used in architecture, furniture, vehicles and ships, packages and the like and decorative laminated sheet utilizing the laminated veneer lumber.

BACKGROUND OF THE RELATED ART

Laminated veneer lumber comprising veneer sheets which are obtained by cutting a log into veneer having a thickness of 2–3 mm, by use of a rotary lathe or a slicer, and by then laminating and bonding the same with their grain directions arranged primarily in parallel is widely used as the material of choice for structures and fixtures of a wooden house, e.g., a door, a door frame, a door casing and a door stop. Such lumber is also used for various other items and as a hardwood structural material that combines a decorative material such as a faceplate, a frame and a leg of furniture, a wall trim for ceiling, a skirting, and a base, a faceplate, a door or a counter top of a cupboard.

Laminated veneer lumber (hereinafter LVL) is obtained from logs of broad-leaved trees such as lauans and beech wood, or of acicular trees such as North American woods, Japanese cypress and cedar by chopping the log into longitudinal segments of selected length and turning the segments into veneer sheets of 2–3 mm thickness using a rotary lathe. Veneer sheets thus obtained typically are then dried using a veneer drier, laminated by arranging them in parallel in the grain direction, and bonded with adhesive. The laminated veneer sheets are subjected to a cold press for provisional compression prior to a hot press for heated compression. As is well-known, all woods contain lignin which is a naturally occurring material bonding together adjacent fibers in the wood material. Alternatively, the laminated veneer sheets may be simply subjected to continuous press processing. Subsequently, the lamination of veneer sheets is flattened, cut into a given width and ground on a major surface with a sander to obtain an LVL.

The prior art method of manufacturing LVL is unsatisfactory in that a rotary-cut or sliced veneer sheet is generally wavy rather than flat over its entirety. It is difficult to flatten the veneer sheet obtained by the prior art method even if drying is conducted under pressure, and wavy veneer sheets cannot be firmly bonded with one another when laminated with adhesive.

It is also extremely difficult to obtain a laminated veneer lumber which is generally flat even if the lamination of veneer sheets is subjected to cold and hot presses, or simply to a continuous press processing.

SUMMARY OF THE DISCLOSURE

It is therefore a principal object of the present invention to provide an efficient method of mass-producing a laminated veneer lumber of high quality and to provide an excellent decorative sheet by subjecting the laminated veneer lumber thus obtained to a very simple processing.

According to the present invention, a generally flat veneer sheet is cut into sections each of a predetermined length, the end faces of each section on both edges in the grain direction being cut symmetrically diagonal with each other. An elongated sheet of laminated veneer is then obtained by bonding the sections at their end faces with adhesive while arranging the grains in the same direction. The resulting elongated sheet of laminated veneer is cut into sections each of a predetermined length along the grain direction to obtain sheets of laminated veneer material having transverse seams. Plural sheets of laminated veneer material are laminated with their grain directions arranged in parallel to obtain a laminated veneer sheet core, which in turn is bonded integrally with a generally flat and seamless veneer.

The decorative laminated sheet material produced by the method of the present invention is characterized in that veneer sheets of a predetermined length and having end faces cut symmetrically diagonal at both edges in the grain direction are connected at said end faces with their grain directions aligned to obtain an elongated sheet of laminated veneer. The elongated sheet of laminated veneer thus obtained is cut along the grain direction into sections of a predetermined length to form sheets of laminated veneer material with seams. Plural sheets of laminated veneer material are laminated and bonded with adhesive with their grain directions arranged in parallel with one another to form a laminated veneer core. A sheet of generally flat and seamless veneer is integrally bonded on the surface of said laminated veneer core to provide a laminated veneer lumber which is to be cut into desired shapes.

The method of manufacturing the laminated veneer lumber comprises the following steps:

(a) cutting a thin sheet of veneer obtained by cutting a log with one of a rotary lathe or a slicer into a plurality of veneers each of a predetermined length, placing a stack comprising said plurality of veneers onto a porous conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every press cycle, softening "lignin" inherently present in each of the veneers which constitute the stack while smoothing each veneer by evaporating a moisture content inside said veneers through said porous conveyor belt, transferring the stack by said conveyor belt into a cold press which comprises a fixed lower cold plate and an upper cold plate which moves vertically with respect to said lower cold plate, cooling the stack, which has been made flexible and smoothed by heat, by pressing on the stack for a duration in the range of 15–30 seconds towards the lower cold plate by moving down the upper cold plate, and thereby stabilizing each veneer in a smoothing state;

(b) separating said stack into respective veneers and cutting each of the flattened veneers on two edges in the grain direction to form symmetrically diagonal end faces;

(c) bonding pluralities of thus obtained flattened veneers at said symmetrically diagonal end faces to obtain a plurality of elongated sheets of veneer; and, (d) cutting the elongated plural sheets of veneer in the grain direction into a predetermined length, laminating plural sheets of thus obtained laminated veneer material with seams with their grain directions aligned, and covering a surface of the laminated veneer material with another thin sheet of seamless veneer.

A method of manufacturing laminated veneer lumber according to another aspect of this invention comprises the following steps:

(a) cutting a thin elongate sheet of veneer obtained by cutting a log with a rotary lathe or a slicer into a plurality of veneers of predetermined length, placing a stack comprising said plurality of veneers onto a porous conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every press cycle, softening "lignin" inherently present in each of the veneers which constitute the stack while smoothing each veneer by evaporating a moisture content inside said veneers through said porous conveyor belt, transferring the stack by said conveyor belt into a cold press which comprises a fixed lower cold plate and an upper cold plate which moves vertically with respect to said lower cold plate, cooling the stack, which has been made flexible and smoothed by heat, by pressing on the stack for a duration in the range of 15–30 seconds towards the lower cold plate by moving down the upper cold plate, and thereby stabilizing each veneer in a smoothing state;

(b) separating said stack into respective veneers and cutting each of the veneers, thus flattened, on two edges in the grain direction to form symmetrically diagonal end faces;

(c) bonding pluralities of thus obtained veneers at said symmetrically diagonal end faces thereof to obtain a plurality of elongated sheets of veneer; and, (d) cutting the elongated plural sheets of veneer in the grain direction into a predetermined length and laminating plural sheets of thus obtained laminated veneer material with seams with the grain directions aligned.

Still another method of manufacturing laminated veneer lumber according to this invention comprises the following steps:

(a) cutting a thin sheet of veneer obtained by cutting a log with a rotary lathe or a slicer into a plurality of veneers of predetermined length, placing a stack comprising said plurality of veneers, onto a conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every press cycle, softening the "lignin" in each of the veneers which constitute the stack by repeating said processing, while smoothing each veneer by evaporating a moisture content inside said veneers, transferring the stack by said conveyor belt into a cold press which comprises a fixed lower cold plate and an upper cold plate which moves vertically with respect to said lower cold plate, cooling the stack, which has been made flexible and smoothed by heat, being pressed for a duration in the range of 15–30 seconds towards the side of the lower cold plate by moving down the upper cold plate, and stabilizing each veneer in a smoothing state;

(b) separating said stack into respective veneers and cutting each of the flattened veneers on both edges in the grain direction to form symmetrically diagonal end faces;

(c) bonding pluralities of thus obtained veneers at said symmetrically diagonal end faces to obtain a plurality of elongated sheets of veneer; and (d) cutting the elongated plural sheets of veneer in the grain direction into a predetermined length, laminating plural sheets of thus obtained laminated veneer material with seams with their grain directions aligned, and covering the surface of the laminated veneer material with another thin sheet of seamless veneer.

Still another method of manufacturing laminated veneer lumber according to this invention comprises the following steps:

(a) cutting a thin sheet of veneer obtained by cutting a log with a rotary lathe or a slicer into a plurality of veneers of predetermined length, placing a stack comprising said plurality of veneers, onto a conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every press cycle, softening the "lignin" in each of the veneers which constitute the stack by repeating said processing, while smoothing each veneer by evaporating a moisture content inside said veneers, transferring the stack by said conveyor belt into a cold press which comprises a fixed lower cold plate and an upper cold plate which moves vertically with respect to said lower cold plate, cooling the stack, which has been made flexible and smoothed by heat, being pressed for a duration in the range of 15–30 seconds towards the side of the lower cold plate by moving down the upper cold plate, and stabilizing each veneer in a smoothing state;

(b) separating said stack into respective veneers and cutting the flattened veneer on both edges in the grain direction to form symmetrically diagonal end faces;

(c) bonding pluralities of thus obtained veneers at said symmetrically diagonal end faces to obtain a plurality of elongated sheets of veneer; and (d) cutting the elongated plural sheets of veneer in the grain direction into a predetermined length and laminating plural sheets of thus obtained laminated veneer material with seams with their grain directions aligned.

Although veneer sheet to be used in the laminated veneer lumber according to the present invention is not specifically limited in terms of the wood material and thickness used so long as the veneer sheet is obtained by slicing a log with a rotary lathe or a slicer and is sufficiently thin, the veneer thickness is preferably between 2–3 mm and the width generally between 600–1200 mm to ensure subsequent workability. These values may be varied to correspond to the planar area of the laminated veneer lumber or decorative laminated sheet material to be obtained.

Veneer sheet usually comes in a dried state but is still supple enough for easy processing, and thus is generally wavy and not flat. It is therefore alternately subjected to hot and cold presses to be flattened. The hot press step causes the lignin to soften. The pressing is preferably carried out with one surface of the veneer being pressed against a porous flat belt-like element which permits passage therethrough of any water vapor or steam generated due to the application of heat. Thus a drying function is performed during the pressing step. This step therefore results in the production of a compacted veneer sheet with even surfaces both at the front and the back.

A generally flat sheet of veneer thus obtained is cut symmetrically diagonal at its end faces in the grain direction, and a plurality of such sections are connected and bonded at said diagonally cut end faces to form an elongated sheet of veneer wherein the grains run in the same direction. The elongated sheet of veneer thus obtained is cut along the grain direction into a predetermined length to obtain sheets of laminated veneer material with seams, which in turn are laminated with their grain directions aligned to form a laminated veneer core.

Although the veneer used in the laminated veneer core preferably contains the least possible knars and cracks, knars and cracks are allowable so long as the quality and the strength of the core are maintained.

The laminated veneer core has seams, and is to be covered with a generally flat sheet of seamless veneer on its surface to form laminated veneer lumber.

Veneer sheet to be overlaid on and bonded to the surface of the laminated veneer core is not specifically limited in the wood material and thickness so long as it is seamless. Such overlay veneer sheets may be of the wood material or different from the core veneer material, and may be of a thickness similar to that of the core material, or of about 0.5 mm.

The term "seamless veneer" used herein includes connected veneers that are so connected that the seams are made inconspicuous, as well as those physically free of seams.

In the foregoing, the laminated veneer core is obtained by cutting the elongated sheet of laminated veneer with seams into sections of a predetermined length and laminating such sections with their grain directions arranged in parallel. However, it is also possible to laminate the elongated sheets of veneer with seams with the grain directions arranged in parallel and then cut the same along the grain direction into a predetermined length to obtain the core.

The laminated veneer core thus obtained need not always be covered with a seamless veneer on its surface to obtain the laminated veneer lumber of the present invention. The veneer core having seams on its surface can be effectively used in the same manner as it is when used as a core material for various structural members.

According to the present invention laminated veneer lumber comprising plural layers of veneer material, plural sheets of generally flat veneer having symmetrically diagonal end faces are bonded with each other at said end faces to obtain an elongated veneer sheet and the resultant elongated veneer sheet is cut into sections of a predetermined length and laminated to obtain a laminated veneer core. Therefore, any desired type of laminated veneer lumber can be obtained by varying the type of veneer sheet which is placed on top of the surface of the laminated veneer core.

Decorative laminated sheet according to the present invention is obtained by cutting said laminated veneer lumber, and any desired type of decorative sheet can be obtained by varying the type of the veneer sheet which is placed on the surface of the core material as well as the type of cutting.

According to one aspect of the present invention method of manufacture, a thin sheet of veneer having a predetermined length and obtained by cutting a log with a rotary lathe or a slicer is flattened prior to use by alternately subjecting the same to hot and cold presses on a porous conveyor belt. This facilitates flattening cutting of the sheet to produce symmetrically diagonal end faces. It also achieves firm and secure bonding of cut sheets at their end faces with adhesive.

According to another embodiment of the present invention method, the surface of a log to be cut with a rotary lathe is applied with pressure using a pressure bar, so that the resultant veneer sheets will have a fine and crack-free surface.

According to still another embodiment of the present invention method, the laminated veneer lumber will have seams on its surface. Because of excellent mechanical strength, however, the laminated veneer lumber can be effectively used as a core of various structural materials.

BRIEF DESCRIPTION OF THE DRAWINGS

FIG. 9 is a view to explain the application of hot and cold presses for flattening pluralities of rotary-cut or sliced veneer sheets on a porous conveyor belt.

DETAILED DESCRIPTION OF THE PREFERRED EMBODIMENTS

Preferred embodiments of laminated veneer lumber, decorative laminated sheet utilizing the laminated veneer lumber and the manufacture method therefor according to this invention will now be described in more detail with reference to the accompanying drawings.

Figure 1:
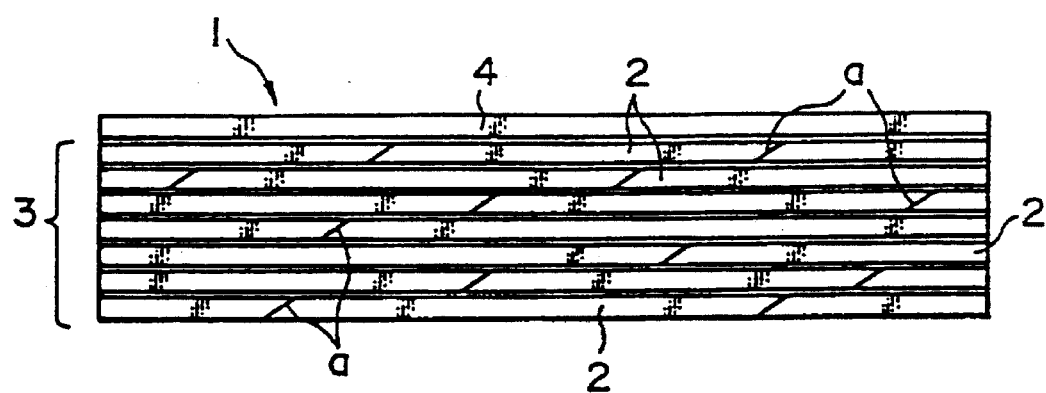
FIG. 1 is a side view to show a laminated veneer lumber according to the present invention.

FIG. 1 shows one embodiment of a laminated veneer lumber according to the present invention wherein a laminated veneer lumber 1 includes a core 3 comprising plural sheets of laminated veneer 2 of a predetermined length each of which sheets is generally flat and has seams a, and an outer sheet of seamless veneer 4 which is laminated and bonded on a surface of the core 3.

Figure 4:
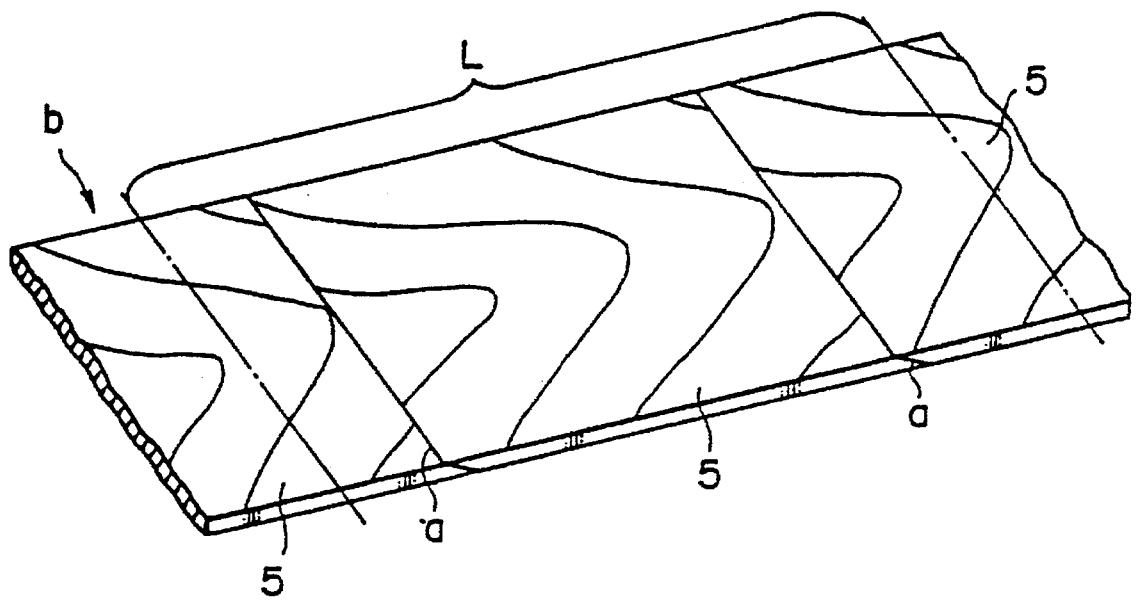
FIG. 4 is a perspective view to show a portion of an elongated sheet of laminated veneer obtained by laminating sheets of flattened veneer shown in FIG. 3.

A relatively thin sheet of veneer of a predetermined length measuring, for example, 600 mm in width and 2 mm in thickness is obtained by slicing a log with a rotary lathe or a slicer and is cut to have symmetrically diagonal end faces 5a slanted at about 45° in the grain direction. Sheets of veneer 5, 5 to be connected are bonded with adhesive applied on the slanted end faces 5a, 5a with their grain directions aligned. The bonded veneer sheets are contact-pressed at the seams a to form an elongated veneer sheet 6. The resultant elongated veneer sheet 6 is cut along the grain direction into sheets of a given length L, as shown in FIG. 4.

Figure 5:
FIG. 5 is a side view to show in an exaggerated manner the veneer shown in FIG. 3 prior to flattening process.

Veneer sheets 5 of a predetermined length obtained by slicing a log with a rotary lathe or a slicer are dried using a dryer device (not shown) to remove excess moisture with care exercised to avoid impairing the flexibility of the veneer as it dries. This drying process is likely to cause the veneer sheet to become wavy, as shown in FIG. 5. To flatten this generally wavy veneer sheet 5, the veneer is alternately subjected to hot and cold presses, to eventually obtain a flat and closely pressed veneer.

A veneer sheet 4 to be placed and bonded on the veneer core 3 may be a veneer of the same wood material as the veneer sheet 5 and is preferably "seamless". A strip or sheet of sliced veneer of about 0.5 mm thickness attached with a non-woven cloth on the back thereof may also be used.

Figure 6:
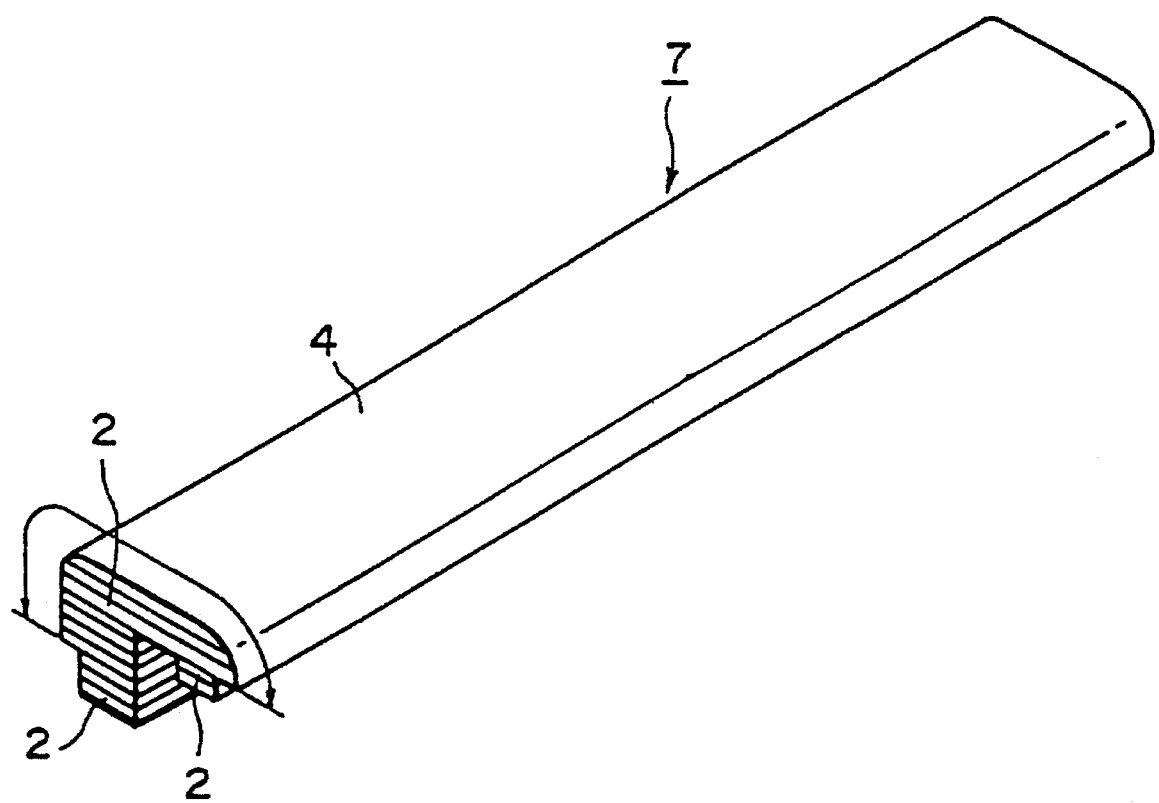
FIG. 6 is a perspective view to show a decorative laminated sheet which utilizes the laminated veneer lumber according to the present invention.

FIG. 6 shows a decorative laminated sheet which is obtained by machining the laminated veneer lumber 1 and which can be used as a casing material such as for door frames. The outer veneer 4 may be painted, if required, over the entire outer surface thereof alone as mentioned earlier, or over the area thereof which will be exposed, namely within the scope defined by the arrow in FIG. 6.

The laminated veneer lumber 1 of the above construction is manufactured by the method described below.

Figure 7:
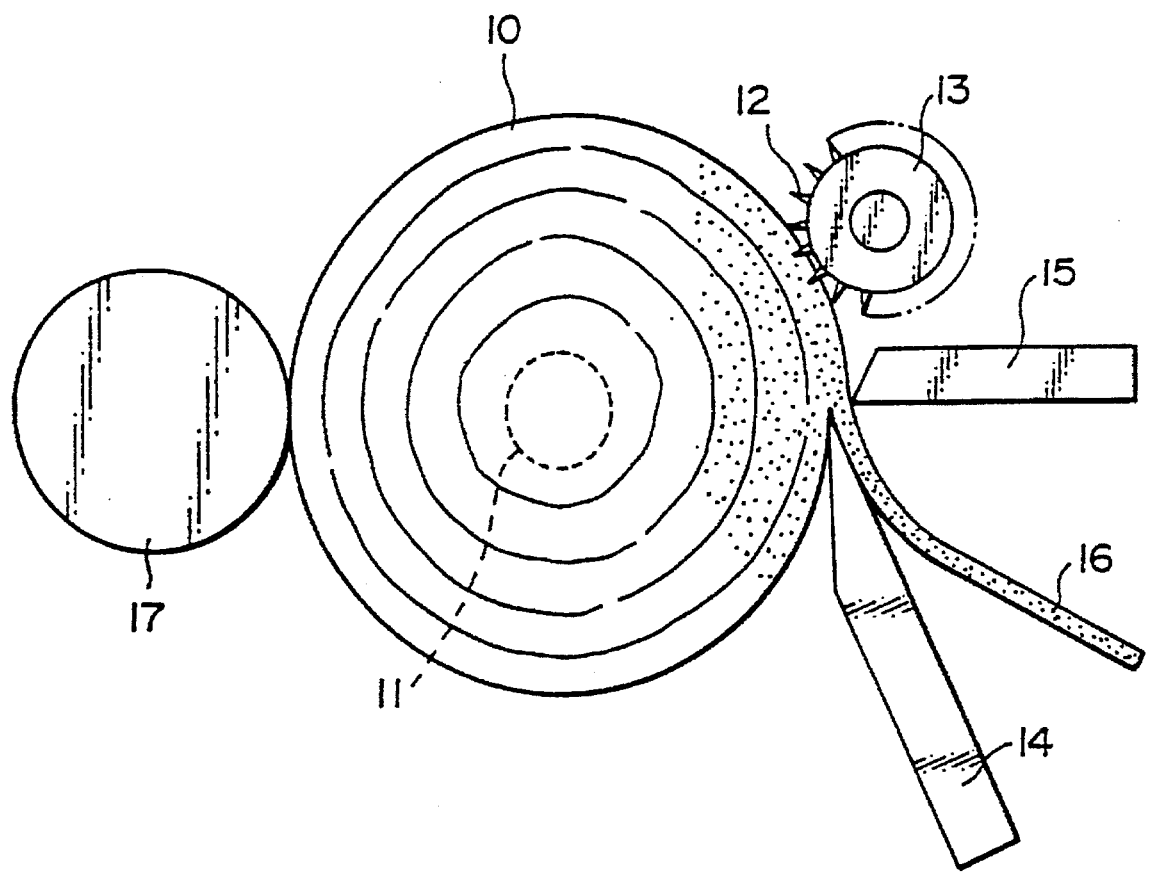
FIG. 7 is an explanatory view to show the process of manufacturing rotary-cut veneer to be used in the present invention method.

Referring to FIG. 7, the reference number 10 denotes a log of deciduous tree such as North American woods cut into sections of 1,200–3,000 mm length. The log 10 is rotatably supported by a chuck 11 on the cut faces at the center. A rotary driving roll 13 provided with plural blades 12 on its periphery is attached to the log 10 with the blades slightly biting into the log surface. A blade 14 of the rotary lathe is set at an angle so that the log 10 can be peeled for the thickness of 2–3 mm. At the same time, a pressure bar 15 is used to press the log 10 at a position immediately downstream to said blade 14 to obtain a sheet of rotary-cut veneer 16 having a compressed tissue. The back of the log 10 is constantly in contact with a back up roll 17 which does not rotate. The back up roll 17 is provided for the purpose of maintaining the log 10 under a predetermined level of pressure achieved by the pressure bar 15 with the pressurizing force even when the log diameter gradually decreases due to cutting by the blade of the rotary lathe and of obtaining veneer 16 of the uniforms thickness.

Although logs of deciduous North American woods are used in the embodiments mentioned above for their availability as well as for economy, the log material is not limited thereby.

Figure 8:
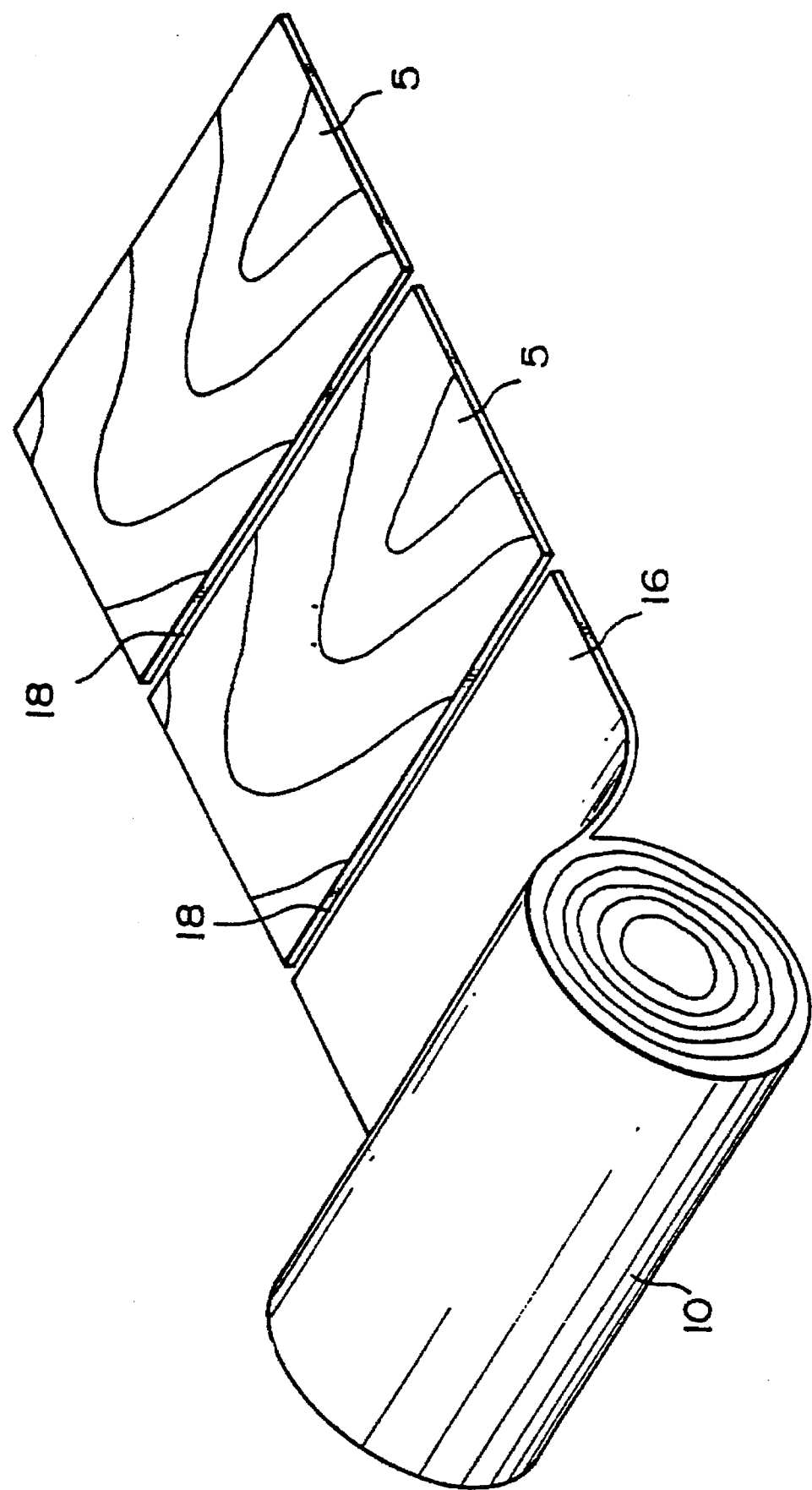
FIG. 8 is an explanatory view to show the process of manufacturing veneer by cutting a sheet of rotary-cut veneer sheet in a direction perpendicular to the feed direction.

The rotary-cut long veneer sheet 16 peeled off from a log by the blade is subjected to cutting 18 in a direction perpendicular to the feed direction, as shown in FIG. 8, to obtain pieces of compressed veneer 5 of 600–1200 mm length, or any other length that corresponds to the surface area of the decorative laminated sheet to be obtained from the laminated veneer lumber 1 of the present invention.

Pieces of veneer 5 thus obtained are sent to a dryer device to remove the moisture content to a degree that would not impair flexibility. Immediately before or after subjecting the pieces of veneer 5 to drying, those having knars or cracks that are too big to be tolerated are eliminated.

A piece of veneer 5, having passed through a dryer, is of a relatively small thickness of 2–3 mm. As a result, the veneer piece 5 having been removed of a large portion of its moisture becomes wavy in all directions, as shown in FIG. 5 in an exaggerated manner. A wavy and irregular veneer piece 5 if used as it is would result in unsatisfactory bonding in the later stage and reduce the workability. It is therefore necessary to flatten the same in advance.

Plural dried veneer pieces 5 are simply laminated, being aligned in both the lengthwise direction and the widthwise direction to make a stack of veneers, and sequentially passed through a hot press 20 and a cold press 21 under pressure, the presses being connected by an endless conveyor belt 19 of intermittent motion. The hot press 20 heats the veneer pieces 5 to make each flexible, and the cold press 21 rapidly cools the heated stack of veneers to remove irregularities thereof and flatten the same on both surfaces to produce smooth veneer pieces 5. The hot press 20 comprises a fixed lower hot plate 20a and an upper hot plate 20b which moves vertically with respect to the lower hot plate 20a, while the cold press 21 comprises a fixed lower cold plate 21a and an upper cold plate 21a which moves vertically with respect to the lower cold plate 21a.

Processing with the hot press 20 is conducted at the temperature of 140° C. and pressure of about 1 kg/cm² for about 40–60 seconds to soften the lignin which is contained in the veneer pieces to thereby make each entire veneer piece flexible.

Note that the laminated veneer pieces being pressed in hot press 20 make contact on the upper surface of the uppermost veneer sheet "5a" directly with a heated press plate, whereas the lower surface of the lowest veneer sheet 5b makes pressing contact with the upper surface of the conveyor belt 19 underneath it. Conveyor belt 19 is not only flexible but is also somewhat porous to allow passage therethrough to any vapors or steam generated during the hot press operation due to heating of any moisture left in the veneer material. Thus the hot press, because of the porous belt both presses and dries by heating.

The purpose of hot press 20 is to press veneers together with the application of heat, for rapid heat-up inside the same up to 80° C. or more in order to make the veneer lumber texture flexible by softening the "lignin", which is inherently present as a naturally occurring ingredient in the wood, while flattening the wavy veneers by evaporating some of the moisture content inside the same.

A stack is initially formed by vertically laminating veneers, which are aligned in both the lengthwise direction and the widthwise direction, and the stack is then placed on the belt of the conveyor 3 which acts to transfer it into the hot press 20.

In a manufacturing facility, typically the hot press comprises the upper hot plate 20b which moves vertically while being supported by an upper hot plate supporting frame and the lower hot plate 20a which is fixed on a lower hot plate supporting frame. Details of these frames are not shown, but persons or ordinary skill in the art should be able to obtain or make the frames easily.

The stack, which is transferred by the conveyor belt 19, is repeatedly pressed while being heated, preferably under a pressure of 0.6–1.2 kg/cm² for 40–60 seconds every time and 2–3 times every cycle, towards the lower hot plate 20a by operating the upper and lower hot plates cooperatively. The repeated pressing process with heat causes evaporation of the moisture content present inside the veneers.

The temperatures of both the upper and lower hot plate are preferably maintained at approximately 140° C. with highly heated water vapor at a temperature in the range 120°–150° C. in known manner.

The purpose of the cold press which is encountered after the hot press by the highly heated stack, which comprises veneers in which the "lignin" is softened during the pressing with the hot press, is to cool the stack rapidly to 20° C. or below to stabilize each entire veneer in a smoothing state.

The cold press 21 comprises upper cold plate 21b which moves vertically while being supported by an upper cold plate supporting frame and the lower cold plate 21a which is fixed on a lower cold plate supporting frame. Again, details of these frames themselves are a matter of design choice and are not shown.

The stack is pressed while being cooled, under a pressure of 0.6–1.2 kg/cm² and for 15–30 seconds, towards the lower cold plate 21a by operating the upper plate 21b and the lower cold plates cooperatively.

The temperatures of the upper cold plate and the lower cold plate are maintained at 15° C. or below with a cooled water flow in known manner.

Although pieces of laminated veneer 5 are passed through the hot and cold presses 20 and 21 respectively in this embodiment, one can also optionally conduct the process by arranging the pieces of veneer 5 horizontally instead of being stacked in the laminating relationship per FIG. 9.

Figure 2:
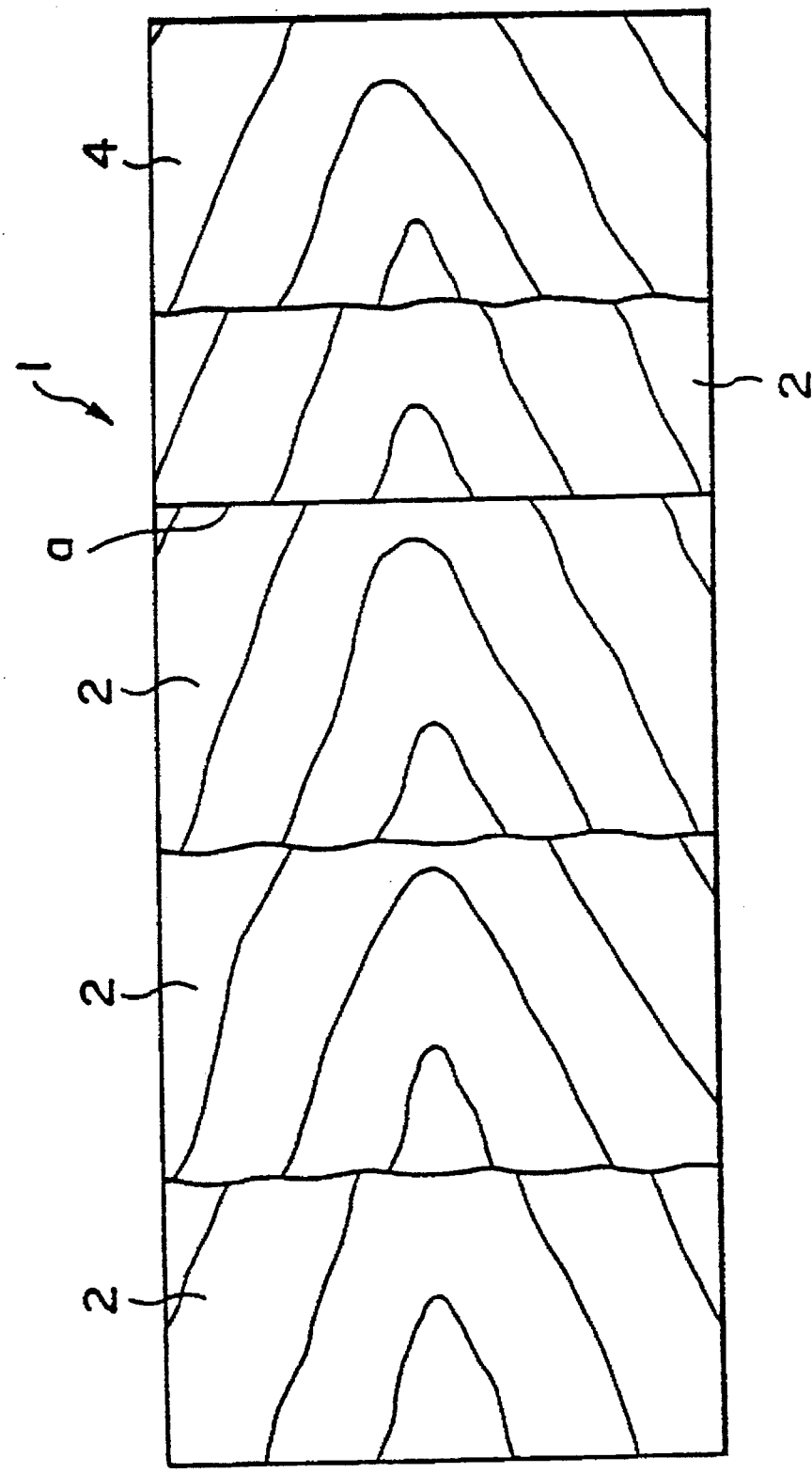
FIG. 2 is a partially exploded enlarged plan view of the laminated veneer lumber shown in FIG. 1.

Pieces of veneer generally flattened by the hot and cold presses, as described, are machined to have at opposed edges symmetrically diagonal end faces 5a in the grain direction (FIG. 2). The end face 5a of a piece 5 facing downward is abutted with the end face 5a of another veneer piece 5 facing upward to be pressed and bonded together by means of adhesive. An elongated sheet of veneer 6 is thus obtained. When integrally bonding the veneer pieces 5, they are so arranged that the grain directions thereof are aligned.

Figure 3:
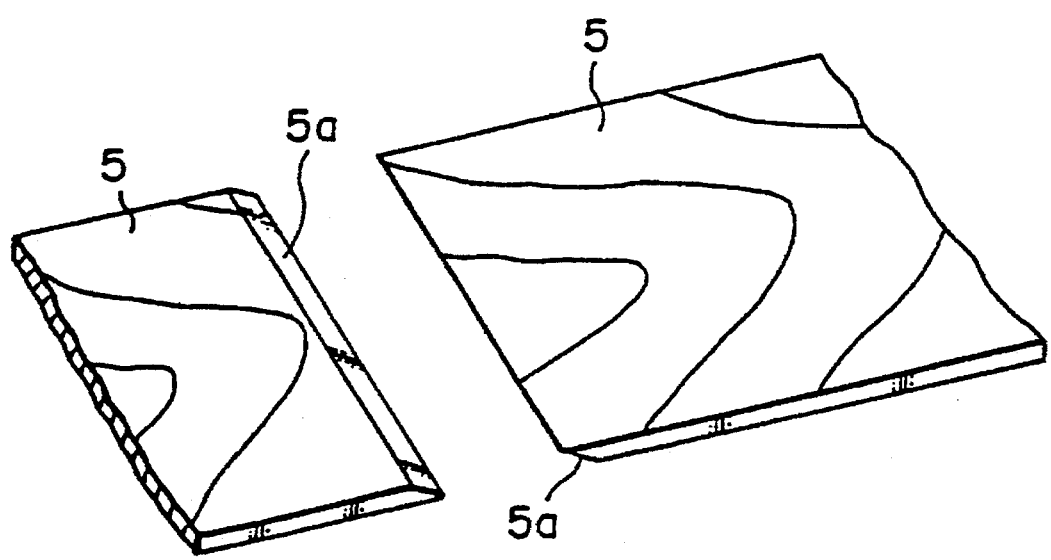
FIG. 3 is an enlarged perspective view to show the essential parts of a flattened veneer to be used in the laminated veneer lumber.

The elongated sheet of veneer 6 arranged in the same grain direction is then cut into sections of a predetermined length L along the grain direction, as shown in FIG. 3, to obtain sheets of laminated veneer material 2 with seams a.

A sheet of laminated veneer material 2 has seams a at least at portions thereof. The front and the back surfaces of this laminated sheet material 2 having seams a are applied, for example, with urea-base adhesive and pressed to be integrally laminated with their grains arranged in the same direction to obtain a laminated veneer core 3.

The core 3 may contain relatively small knars and minor cracks insofar as these defects would not lead to an extreme degradation of the product quality of the laminated veneer lumber 1.

A sheet of seamless veneer 4 having a predetermined length is placed on the surface of the thus obtained core 3 with the grains in parallel arrangement, and integrally laminated and bonded to obtain the laminated veneer lumber 1.

The veneer 4 to be bonded on the surface of the core 3 is, unlike the veneer material 2, seamless over its entire surface and is generally flattened. Its thickness is not particularly limited, although the core 3 in the embodiment has the same thickness as the laminated veneer material 2. Veneer as thin as 0.5 mm may also be used, and the laminated veneer lumber comprising such thin veneer sheets can be used as a decorative laminated sheet 7 by simply subjecting the same to machining.

The foregoing relates to a method of manufacturing laminated veneer lumber 1 of which the surface is covered with a seamless veneer sheet. Although the laminated veneer lumber according to claim 8 of this invention has seams exposed on its surface, it can be effectively used as a core for various structural materials because of its mechanical strength.

According to the present invention, generally flat and thin sheets of veneer of a predetermined length obtained by cutting a log with a rotary lathe, a slicer or the like are laminate and bonded to form a core, on which a sheet of seamless veneer is placed with the grain directions of both layers being in parallel with each other, and is integrally bonded. As a result, bonding of the veneer layers is very firm and of high quality, such that the final products can be applied to wide range of use such as construction, industry and daily necessaries because of their consistent mechanical properties.

A decorative laminated sheet can be obtained by simply machining the laminated veneer lumber into any desired form, ensuring economic efficiency. Diversified products are also available by changing the thickness and type of the veneer to be used on the surface.

According to the method according to the present invention, sheets of veneer of a predetermined length obtained by cutting a log with a rotary lathe, a slicer or the like are alternately subjected to hot and cold presses to flatten the same, as previously described, whereby the handling of the veneer sheets in the subsequent steps becomes greatly facilitated.

The flattened veneer sheets are provided with symmetrically diagonal end faces in the grain direction and are bonded at said diagonally cut end faces. As a result, no warping or twisting will occur in the laminated veneer.

Sheets of veneer with their grain directions aligned are bonded at the end faces to obtain an elongated sheet of veneer, which in turn is cut along the grain direction into a predetermined length to obtain sheets of laminated veneer material having seams. Plural sheets of laminated veneer material are further laminated with their grain directions aligned to obtain the laminated veneer lumber. Because the veneer material has no warping or twisting, they can be firmly laminated and bonded with each other with ease. The resultant product of core material has excellent mechanical strength. Because the elongated sheet of veneer is cut into sections of a predetermined length, there is no loss in material, contributing to cost reduction.

Veneer sheet having no seams is overlaid on the surface of laminated veneer core, covering the seams of the core and improving the appearance of the resultant product of laminated veneer lumber. This widens the scope of use of the laminated veneer lumber. By changing the thickness or the raw material of the veneer to be placed on the core material, various types of veneer lumber can be easily obtained.

The present invention is particularly advantageous in that as the laminated veneer lumber is covered with another sheet of seamless veneer, decorative laminated sheets can be easily obtained by cutting the lumber into desired shapes.

According to the present invention method wherein a log is cut with a rotary lathe to obtain a sheet of veneer, the log surface to be cut by blade of the rotary lathe is pressurized with a pressure bar to prevent cracks from occurring on the surface of the cut veneer, increasing the yield as well as the quality of the final product.

Use of deciduous North American woods is particularly advantageous for mass-producing high quality yet inexpensive laminated veneer lumber as the woods are available at low cost.

The laminated veneer lumber has high mechanical strength even when not covered with another sheet of seamless veneer, and can be effectively used as the core of various structural materials despite presence of seams.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A method for manufacturing laminated veneer lumber stabilized to be free of warps or waviness, comprising the steps of:

(a) cutting a thin sheet of veneer obtained by cutting a log with one of a rotary lathe or a slicer into a plurality of veneers of predetermined length, placing a stack comprising said plurality of veneers onto a conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by repeatedly moving the upper hot plate toward the fixed lower hot plate to apply pressure for durations of 40–60 seconds 2–3 times every hot press cycle, thereby softening the "lignin" in each of the veneers which constitute the stack while smoothing each veneer by evaporating a moisture content therein, transferring the stack by said conveyor belt into a cold press which comprises a fixed lower cold plate and an upper cold plate which moves vertically with respect to said lower cold plate, cooling the stack, which has been made flexible and smoothed by heat, the cooling stack being pressed for a duration in the range of 15–30 seconds towards the side of the lower cold plate by moving down the upper cold plate, and stabilizing each veneer in a smoothed and flattened state;

(b) separating said stack into respective veneers and cutting the flattened veneers on both edges thereof in a grain direction to form symmetrically diagonal end faces;

(c) bonding pluralities of thus obtained cut veneers at said symmetrically diagonal end faces to obtain a plurality of elongated sheets of veneer; and (d) cutting the elongated sheets of veneer in the grain direction into sheets of predetermined length and laminating plural sheets with seams therein with their respective grain directions aligned.

2. The method according to claim 1, wherein:

the upper and lower hot plates are maintained at a temperature of approximately 140° C.

3. The method according to claim 2, wherein:

the hot press is operated to apply to the stacked veneer a pressure in the range 0.6–1.2 kg/cm².

4. The method according to claim 3 wherein:

the upper and lower cold plates are operated so as to press the stacked veneer to a pressure in the range 0.6–1.2 kg/cm².

5. A method for manufacturing laminated veneer lumber stabilized to be free of warps or waviness, comprising the steps of:

(a) cutting a thin sheet of veneer obtained by cutting a log with one of a rotary lathe or a slicer into a plurality of veneers of predetermined length, placing a stack comprising said plurality of veneers onto a conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by repeatedly moving the upper hot plate toward the fixed lower hot plate to apply pressure for durations of 40–60 seconds 2–3 times every hot press cycle, thereby softening the "lignin" in each of the veneers which constitute the stack while heating and smoothing each veneer by evaporating a moisture content therein, transferring the stack by said conveyor belt into a cold press which comprises a fixed lower cold plate and an upper cold plate which moves vertically with respect to said lower cold plate, cooling the stack, which has been made flexible and smoothed by heat, the cooling stack being pressed for a duration in the range 15–30 seconds towards the side of the lower cold plate by moving down the upper cold plate, and stabilizing each veneer in a smoothed flattened state;

(b) separating said stack into respective veneers and cutting each of the flattened veneers on both edges in a grain direction to form symmetrically diagonal end faces;

(c) bonding pluralities of thus obtained veneers at said symmetrically diagonal end faces to obtain a plurality of elongated sheets of veneer; and (d) cutting the elongated sheets of veneer in a grain direction into a predetermined length, laminating the plural sheets with seams therein, with their respective grain directions aligned, and covering the surface of the laminated veneer material with another thin sheet of seamless veneer.

6. The method according to claim 5, wherein:

the upper and lower cold plates are operated so as to press the stacked veneer to a pressure in the range 0.6–1.2 kg/cm².

7. A method for manufacturing laminated veneer lumber stabilized to be free of warps or waviness, comprising the steps of:

(a) cutting a thin elongate sheet of veneer obtained by cutting a log with one of a rotary lathe or a slicer into a plurality of veneers of predetermined length, placing a stack comprising said plurality of veneers onto a porous conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every hot press cycle, softening "lignin" inherently present in each of the veneers which constitute the stack while smoothing and flattening each veneer by evaporating a moisture content inside said veneers through said porous conveyor belt, transferring the stack by said conveyor belt into a cold press which comprises a fixed lower cold plate and an upper cold plate which moves vertically with respect to said lower cold plate, cooling the stack, which has been made flexible and smoothed by heat, by pressing on the stack for a duration in the range 15–30 seconds towards the lower cold plate by moving down the upper cold plate, and thereby stabilizing each veneer in a smoothed flattened state;

(b) separating said stack into respective smoothed flattened veneers and cutting each of the veneers, thus smoothed and flattened, on two edges in the grain direction to form symmetrically diagonal end faces;

(c) bonding pluralities of thus obtained cut veneers to form seams at said symmetrically diagonal end faces thereof to obtain a plurality of elongated sheets of veneer; and, (d) cutting the elongated sheets of seamed veneer in a grain direction into sheets of laminated veneer material each of a predetermined length, and laminating plural, sheets with seams and grain directions aligned.

8. The method according to claim 7, wherein:

the upper and lower hot plates are maintained at a temperature of approximately 140° C.

9. The method according to claim 8, wherein:

the temperature of the upper and lower hot plates is maintained by heated water vapor in the range 120°–150° C. in known manner.

10. The method according to claim 7, wherein:

the hot press is operated to apply to the stacked veneer a pressure in the range 0.6–1.2 kg/cm².

11. A method for manufacturing laminated veneer lumber stabilized to be free of warps or waviness, comprising the steps of:

(a) cutting a thin sheet of veneer obtained by cutting a log with one of a rotary lathe or a slicer into a plurality of veneers each of a predetermined length, placing a stack comprising said plurality of veneers onto a porous conveyor belt, transferring said stack into a hot press which comprises a fixed lower hot plate and an upper hot plate which moves vertically with respect to said lower hot plate, operating both said upper hot plate and said lower hot plate while pressing the stack towards the side of the lower hot plate by moving down the upper hot plate to apply pressure for durations of 40–60 seconds 2–3 times every hot press cycle, softening "lignin" inherently present in each of the veneers which constitute the stack while smoothing and flattening each veneer by evaporating a moisture content inside said veneers through said porous conveyor belt, transferring the stack by said conveyor belt into a cold press which comprises a fixed lower cold plate and an upper cold plate which moves vertically with respect to said lower cold plate, cooling the stack, which has been made flexible and smoothed by heat, by pressing on the stack for a duration in the range 15–30 seconds towards the lower cold plate by moving down the upper cold plate, and thereby stabilizing each veneer in a smoothed flattened state;

(b) separating said stack into respective smoothed flattened veneers and cutting each of the smoothed flattened veneers on two edges in the grain direction to form symmetrically diagonal end faces;

(c) bonding pluralities of thus obtained cut veneers to form seams at said symmetrically diagonal end faces thereof to obtain a plurality of elongated sheets of seamed veneer; and, (d) cutting the elongated sheets of seamed veneer in a grain direction into a plurality of sheets each of a predetermined length, laminating the plural sheets with seams therein with their grain directions aligned, and covering a surface of the laminated plural sheets with another thin sheet of seamless veneer.

12. The method according to claim 11, wherein:

the upper and lower hot plates are maintained at a temperature of approximately 140° C.

13. The method according to claim 12, wherein:

the temperature of the upper and lower hot plates is maintained by heated water vapor in the range 120°–150° C. in known manner.

14. The method according to claim 11, wherein:

the hot press is operated to apply to the stacked veneer a pressure in the range 0.6–1.2 kg/cm².

15. The method according to claim 11, wherein:

the upper and lower cold plates are operated so as to press the stacked veneer to a pressure in the range 0.6–1.2 kg/cm².

16. The method according to claim 15, wherein:

the temperature of the upper and lower cold plates is maintained by a cooled water flow at or below 15° C. in known manner.

* * * * *

UNITED STATES PATENT AND TRADEMARK OFFICE
CERTIFICATE OF CORRECTION

PATENT NO. : 5,662,760
DATED : September 2, 1997
INVENTOR(S) : Sotaro TSUDA

It is certified that error appears in the above-identified patent and that said Letters Patent is hereby corrected as shown below:

On the title page, item [63] should read as follows:

--[63]  Continuation-in-part of Ser. No. 149,895, Nov. 10, 1993, abandoned.--

Signed and Sealed this

Thirtieth Day of December, 1997

*Attest:*

BRUCE LEHMAN

*Attesting Officer*  *Commissioner of Patents and Trademarks*